United States Patent [19]

Hyun et al.

[11] Patent Number: 5,143,618
[45] Date of Patent: Sep. 1, 1992

[54] PROCESS FOR THE TREATMENT OF ORGANIC WASTEWATER

[75] Inventors: Shin W. Hyun, Seoul; In C. Kang, Euiwang, both of Rep. of Korea

[73] Assignee: Hyundai Engineering Co., Ltd., Seoul, Rep. of Korea

[21] Appl. No.: 700,393

[22] Filed: May 15, 1991

[30] Foreign Application Priority Data

Aug. 30, 1990 [KR] Rep. of Korea .................. 90-13436

[51] Int. Cl.$^5$ .............................. C02F 3/10; C02F 3/04
[52] U.S. Cl. ........................................ 210/615; 210/617
[58] Field of Search ............... 210/715, 617, 618, 290, 210/615

[56] References Cited

U.S. PATENT DOCUMENTS

| | | |
|---|---|---|
| 3,788,981 | 1/1974 | Richard et al. ............... 210/715 |
| 4,284,508 | 8/1981 | Jewell ............................ 210/617 |
| 4,322,296 | 3/1982 | Fan et al. ...................... 210/618 |
| 4,664,803 | 5/1987 | Fuchs et al. .................... 210/617 |
| 4,735,724 | 4/1988 | Chynoweth et al. ............ 210/617 |
| 5,006,249 | 4/1991 | Green et al. .................... 210/617 |
| 5,019,268 | 5/1991 | Rogalla .......................... 210/617 |

Primary Examiner—Ernest G. Therkorn
Attorney, Agent, or Firm—Birch, Stewart, Kolasch & Birch

[57] ABSTRACT

An organic wastewater treatment process which combines a sludge blanket layer process with a media layer process for improving liquid treatment efficiency and cost savings.

5 Claims, 5 Drawing Sheets

PROCESS FOR THE TREATMENT OF ORGANIC WASTEWATER

BACKGROUND OF THE INVENTION

1. Field of the Invention

The present invention relates to a process for the treatment of organic wastewater and an apparatus therefor and more particularly, to an organic wastewater treatment process and an apparatus therefor for treating organic wastewater, especially wastewater having higher concentrations of various components, such as, for example, alcohol wastewater, grape fermentation wastewater, beer wastewater, coffee wastewater or starch wastewater which generally have concentrations 3,000 to 30,000 ppm of B.O.D.

2. Description of the Prior Art

Various types of organic wastewater treatment processes are known in the art. In such processes, the suspended contaminants in a liquid sludge stream are commonly removed by a gravity thickening separation procedure. However, such processes suffer from a number of disadvantages such as, for example, (1) treatment takes a long time, (2) it is very expensive to install the treatment apparatus and maintain it, and (3) the process has a low yield.

SUMMARY OF THE INVENTION

Accordingly, it is an object of the present invention to provide an improved organic wastewater treatment process and an apparatus therefor.

Another object of the present invention is to provide a combined stage process system and an apparatus having a number of unique design features for improving liquid treatment efficiency and cost saving.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an organic wastewater treatment process which combines a sludge blanket layer process with a medium layer member process for improving liquid treatment efficiency and cost savings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
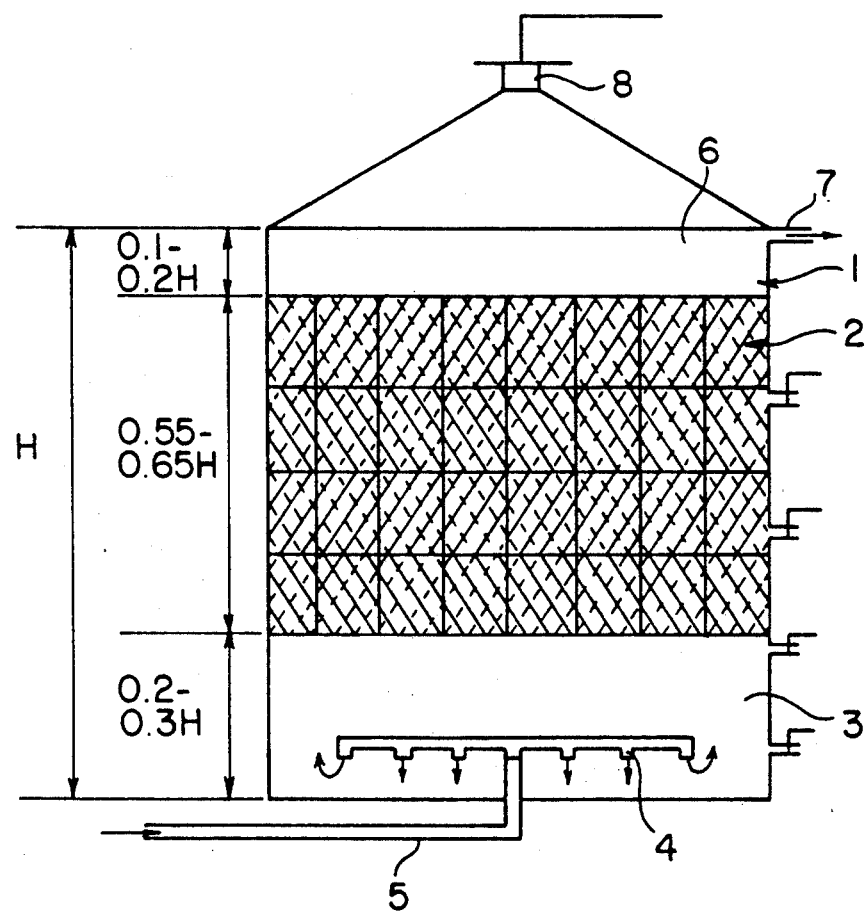
FIG. 1 schematically shows the overall process according to the present invention.
Figure 2:
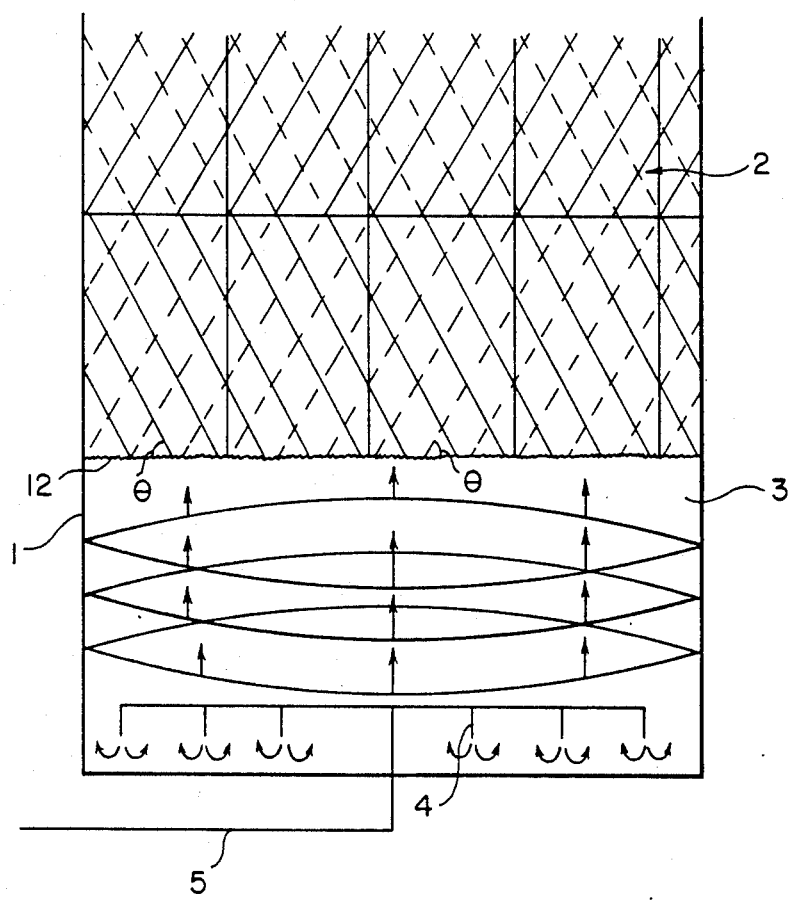
FIG. 2 schematically shows the gradually moving layer depending on the incoming velocity according to the present invention.
Figure 3:
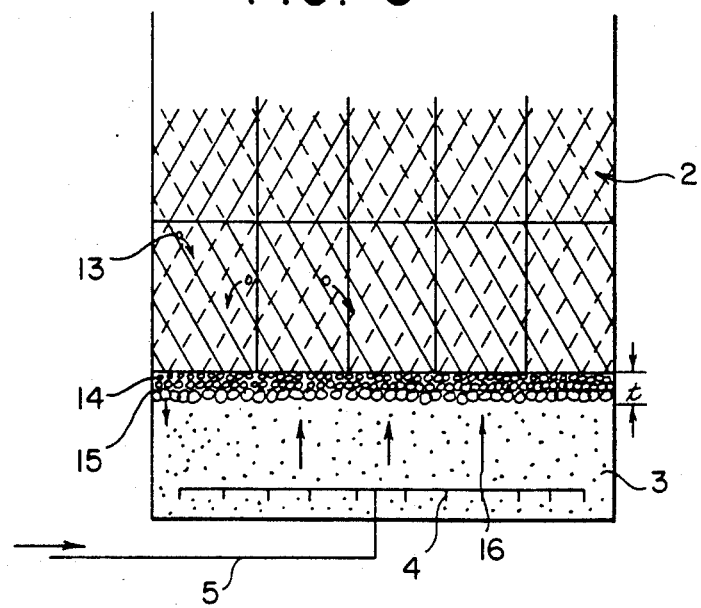
FIG. 3 schematically shows the formation of a sludge blanket layer according to the present invention.

Referring now in detail to the drawings for the purpose of illustrating preferred embodiments of the present invention, the organic wastewater treatment process and the apparatus therefor are shown in FIGS. 1, 2, and 3. The organic wastewater treatment process comprises a sludge blanket layer process and a medium layer member process.

At the first stage of the sludge blanket layer process, over 80% of the wastewater is treated, and at the second stage of the medium layer member process, the remaining untreated organic wastewater is treated. A medium layer member 2 having a certain degree of inclination is formed in the upper and middle portion of a vessel 1. A certain lower space 3 is formed to an inlet pipe 5 within the lower portion of the vessel 1. A sludge blanket layer 15 is formed in the right lower portion of the thick medium layer member 2. At this time, the factor for forming the sludge blanket layer 15 depends on the velocity of the incoming wastewater, the height of the lower space 3 to the medium layer member 2 and the slope of the medium layer member 2.

The sludge blanket layer 15 contains a group of flocs 14 composed of a highly concentrated microorganisms. It is known by experimental record that the blanket layer process can treat almost 80% of the contaminant concentration in the wastewater so that the process rate would be extremely high, even if the incoming wastewater has a very high contaminant concentration since the organic wastewater is thoroughly contacted with the microorganisms which are highly concentrated.

The process for forming the sludge blanket layer 15 is as follows:

Organism membranes are formed at the surface of the medium layer member 2 which is inclined at an angle so that they segregate partly and fall to the lower space 3 through the inclined surface thereof. The small size of the organism membranes allows them to fall to the lower space 3 into the incoming wastewater. These membranes form the group of flocs 14 by contacting one another in a flowing state and the formed floc exhibits water buoyancy. Also, small bubbles 16 produced by the incoming wastewater and produced continuously by anaerobic fermentation attach to these microorganism flocs 14. And the flocs 14 rise to the right lower portion of the medium layer member 2. Thus, the flocs 14 of organism membranes gather in the lower portion of the medium layer member and these gathered flocs 14 actually become the thick sludge blanket layer 15.

Since the surface of the segregated organism membranes exhibits sticky phlegmatic properties like slime, the microorganism membrane of particles 13 in the flowing state within the lower space 3 easily become flocs 14, and the flocs 14 gathered in the lower portion of the medium layer member 2 have high cohesive properties. Thus, the cohered organism membranes begin to stick at the lower surface of the medium layer member 2 and new flocs 14 are united gradually with the sticky flocs 14 by coattraction and the adhesive properties. The blanket layer 15 is formed to the extent of breaking the balance between the upward power caused by the velocity of the incoming wastewater and the weight of the blanket layer 15. Since a large surface unevenness exists in the lower surface of the medium layer member 2, the adhesive properties of the flocs 14 and the medium layer member 2 are high, and the technical construction of the blanket layer 15 which is added to the lower portion of the medium layer 2 is important in the present invention. This relates to the velocity of the wastewater flowing to the lower space 3, the extent of formation of bubbles 16 formed from the reduction in pressure when the bubbles 16 flow from the inlet pipe 5 into the large lower space 3, the extent of formation of gas by anaerobic fermentation according to occupying time within the process vessel 1, the slope of the medium layer member 2, and the height ratio of the medium layer member 2 and the lower space 3, etc.

As shown in FIG. 1, the medium layer member 2 is formed to be 0.55–0.65 H disposed in the middle portion of the process vessel 1 having a height H, an inflow pipe 5 is disposed having a plurality of nozzles 4 perforated downwardly and placed by forming the lower space 3 to be 0.2–0.3 H in the lower portion thereof, and an outlet pipe 7 is connected integrally with the vessel 1 to be connected with an upper space 6 having a height of 0.1–0.2 H for the filtrate.

An air outlet pipe 8 for methane and carbon dioxide ($CH_4 + CO_2$) produced by anaerobic fermentation is formed in the highest upper space 6.

The medium layer member 2 is composed of a plurality of media layers 9 and the media layers 9 are stacked up to 3–5 layers with the surfaces contacting each other. A bent portion 10 of each of the media layers 9 is formed like a wave and is inclined at an angle of 55–65°. Therefore, a plurality of gaps 11 are formed by placing the contacting media in a crisscross pattern. The gaps 1 connect in a zigzag pattern. The ratio of the gaps 11 are formed over 90% of the surface area of the media layers 9 and the specific surface area is over 120 $m^2/m^3$.

Furthermore, the surface area is enlarged by forming a minute unevenness 12 so that flocs 14 composed of the particles 3 stick well to the lower end portion of each media layer 9 in the lowest layer and do not separate therefrom.

Generally, when only the pure medium layer process is utilized after filling up the vessel 1 with the wastewater without forming the blanket layer 15, the required hydrographical period is about 7–10 days so that the rate of treatment is 80–85%, even if much of the media layer 9 is filled up. However, in the present invention, since the medium layer member and the blanket layer 15 formed at the right lower portion of the medium layer member 2 are co-treated by stages, the rate of treatment is 90–95%, even if the required processing period is 1–5 day. It is caused by the thickness of the blanket layer 15, that is, the particles 13 of the sludge which are separated and roll down from the surface inclined at an angle of 55–65° can be gathered in almost uniform thickness because the incoming wastewater flows through layers smoothly and regularly in step by step procedure as shown in FIG. 2 when the vessel 1 has the above described structure and in addition, the rising velocity of wastewater flowing into the lower space 3 is kept with 0.5–2.5 m/day. Since the blanket layer 15 also cannot be dispersed and broken down, 0.5–2.5 m/day of the inflow velocity of wastewater is very important factor, and the advantage effect is that sludge flocs 14 are drawn to the lower portion of the medium 9.

Furthermore, the reason that the medium layer member 2 is inclined to 55–65°, is to properly control incoming wastewater and prevent microorganisms from clogging the medium gaps 11 in the form of microorganism flocs 14.

In the case that the slope of the medium layer 2 is over 65°, the microorganism within the medium layer member 2 and separated from the medium layer member 2 can be outcoming without floating and depositing. In the case that the slope of the medium layer member 2 is under 55°, it is expected to have a high treatment rate for preventing the outcoming of produced microorganisms but the treatment rate becomes uneconomical. Because there is the possibility that the gaps 11 of the medium layer member 2 clog due to the stagnating state of the separated microorganisms, the floating microorganisms within the medium layer member 2 and an inflow solid.

Therefore, the angle range of the slope of the medium layer member 2 is one of the important structural features in order to form the blanket layer 15 according to the present invention.

Furthermore, in the present invention, the structure of the vessel 1 is divided among the medium layer member 2, the lower space 3, and the blanket layer 15 formed in the lower portion of the medium layer member 2. Because of the inflow velocity of the wastewater, the gradual movement of layers caused by the velocity, and the production of bubbles 16 of methane and carbon dioxide gas during a short time, the sludge flocs 14 move upward to the medium layer member 2 and the blanket layer as a support blanket layer 15. Thus, the blanket layer 15 is formed thickly and is highly concentrated. The thick blanket layer 15 processes over 80% of highly the concentrated wastewater. It is an advantageous condition in forming and keeping the blanket layer 15 that the continuously producing bubbles 16 also support the blanket layer 15 so that the layer 15 is not broken down when the inflow velocity is kept within 0.5–2.5 m/day.

As shown in FIG. 3, according to the present invention, the treatment process is as follows:

(a) When the wastewater incoming into the pipe 5 flows downwardly through the nozzles 4, the microorganisms feed within the vessel 1 which provides a new environment and anaerobic bacteria proliferate, and decompose organic substances.

(b) In an early stage, the light microorganism rises with the fluid without deposition due to the rising velocity of the incoming wastewater.

(c) The risen microorganism follow the inclined medium layer member 2 attached to the surface of the media layer 9. Bacteria which form methane and carbon dioxide attach easily to the surface of matter or other bacteria.

Figure 4A:
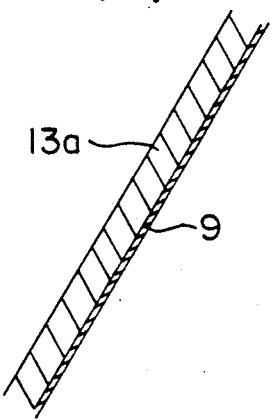
FIGS. 4(a) and 4(b) show the separated state of a particle and the particle layer formed at a medium layer according to the present invention.

(d) As the reaction proceeds, a large number of microorganisms attach to the surface of the medium 9, but in the early stage, a minute particle layer 13a is formed because of the self attaching property of bacteria as shown in FIG. 4(a).

Figure 4B:
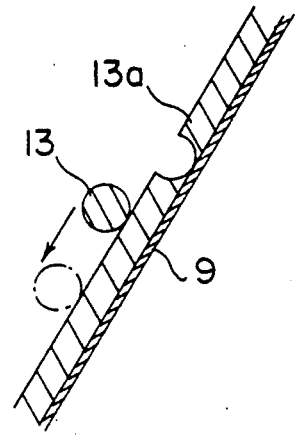
Figure 5:
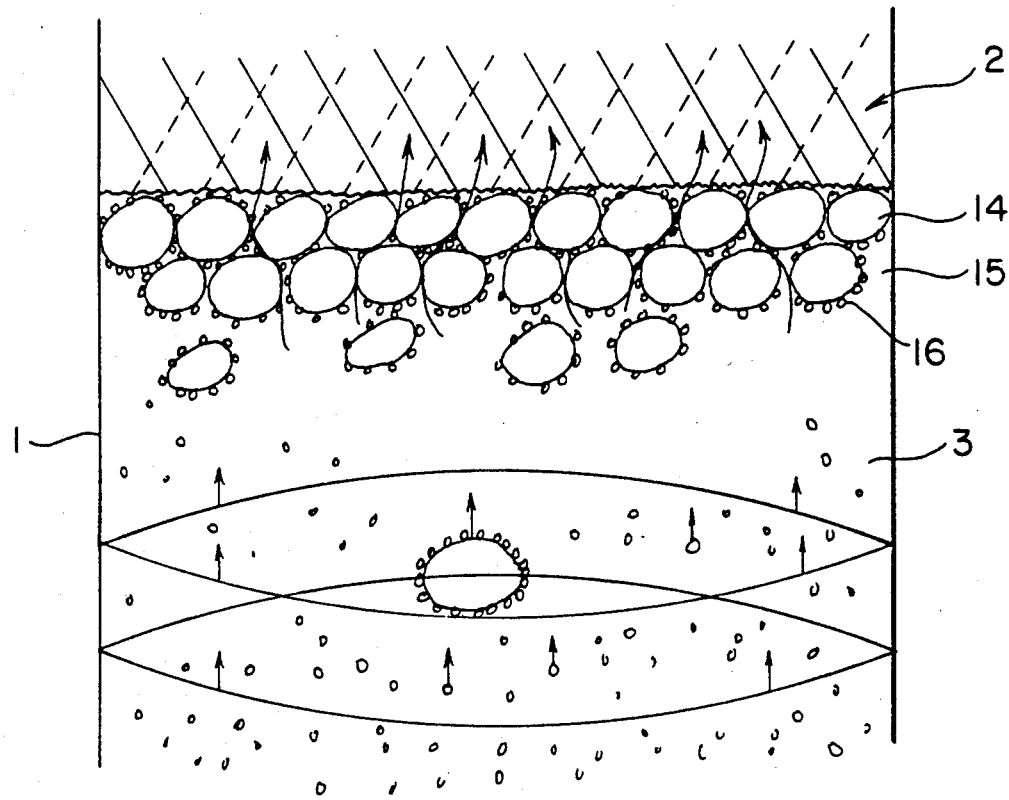
FIG. 5 schematically shows the forming process of the sludge blanket layer according to the present invention.
Figure 6:
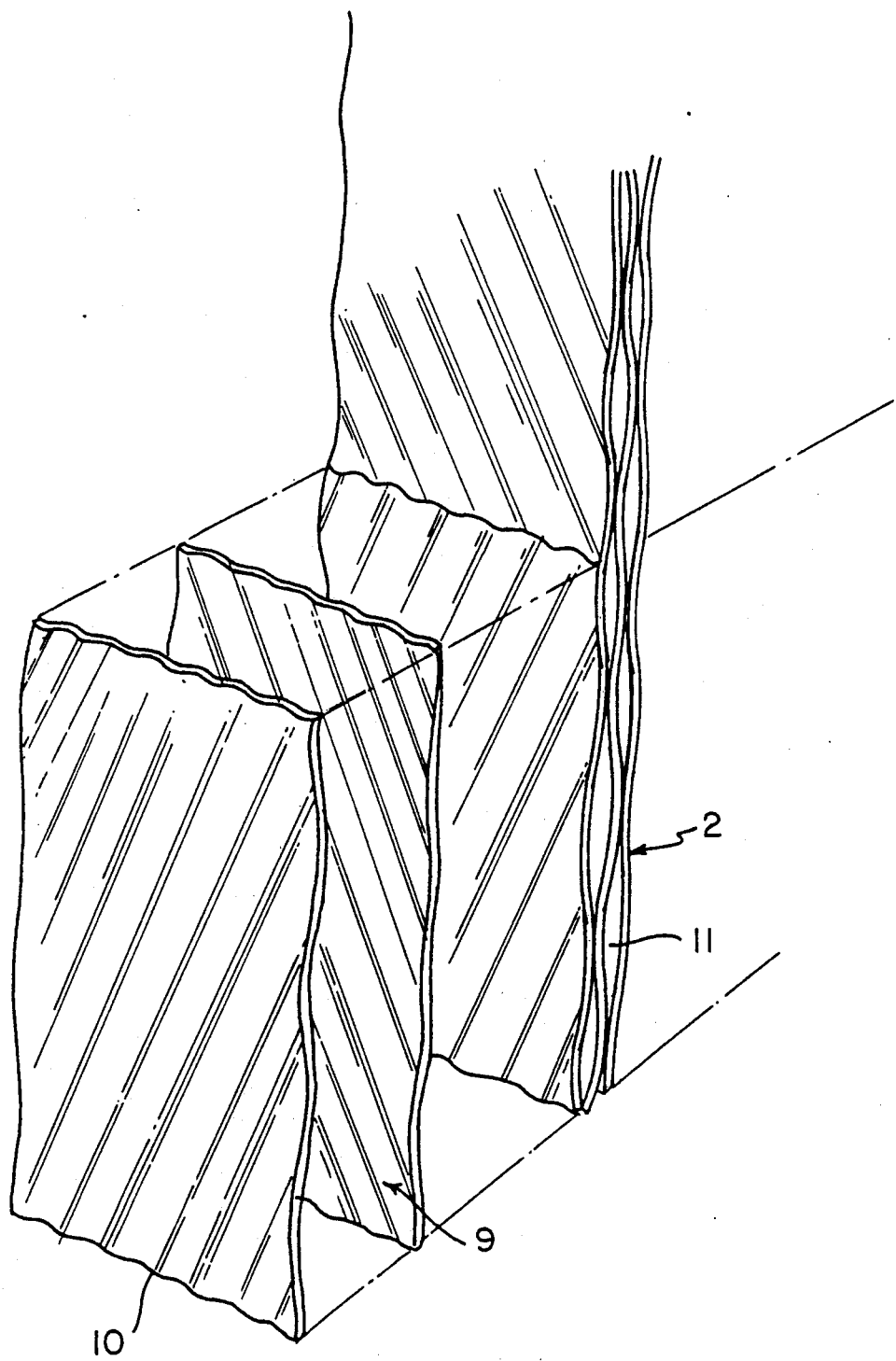
FIG. 6 is an enlarged perspective view of the medium layer member according to the present invention.
Figure 7:
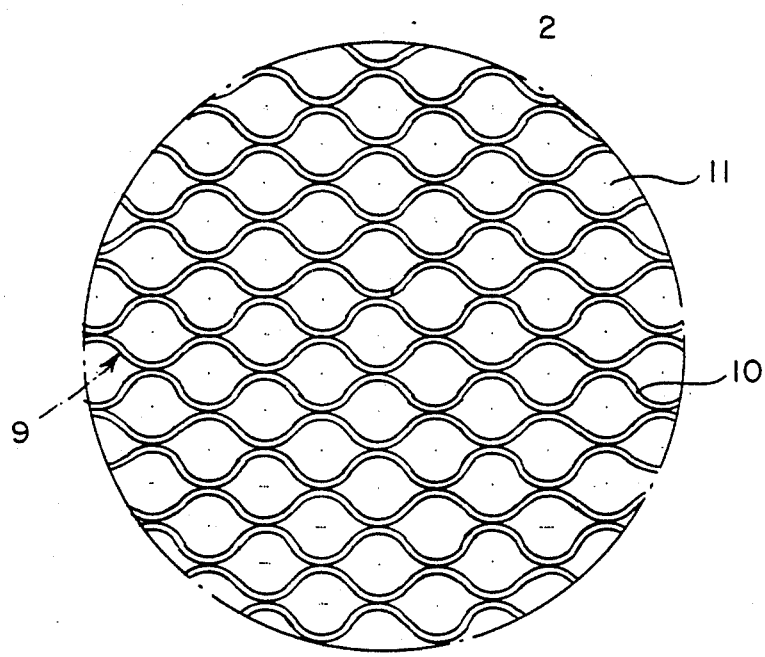
FIG. 7 is a top plan view of the media layer member according to the present invention.
Figure 8:
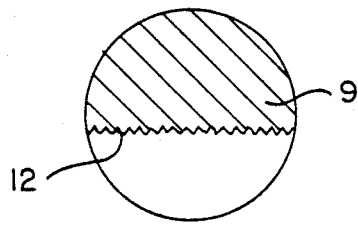
FIG. 8 schematically shows a small unevenness formed at the media layer according to the present invention.
Figure 9:
FIG. 9 schematically shows a floc in detail.

(e) When the particle layer 13a forms to a 1-2 mm thickness at the surface of the medium layer 9, shearing force caused by the rising velocity o the fluid and its specific gravity (weight) force the particles to separate and fall down as shown in FIG. 4(b).

(f) As the particles 13 fall down, the sinking velocity thereof increases because of gathering with other particles 13.

(g) The particles 13 are deposited at the lower portion of reaction vessel 1, but when the flocs 14 become big because of gathering with other particles 13 continuously, the sinking velocity increases.

(h) At this time, since the already deposited particles 13 in the lower portion of the vessel 1 may rise again by the rising velocity of fluid and the bubbles 16 of produced gas and may form a larger floc 14 by attaching to themselves, a lot of the particles 13 remain or float into the lower portion of the vessel 1.

(i) As the depositing velocity of the flocs 14 and the rising velocity of fluid balance in the right lower portion of the media layer 9, the big flocs 14 deposited by following the medium surface form the blanket layer 15. The position which the depositing velocity and the rising velocity balance is about 20-30% under from the surface of the media layer 9.

(j) The microorganism substance incoming from the lower portion of the vessel 1 is dissolved by the microorganism particles 13 in the lower portion of the vessel 1, and wastewater processed about 80% passes through the blanket layer 15 but the microorganisms cannot pass through and accumulate in the lower portion.

(k) The processed wastewater through the blanket layer 15 passes through the medium layer member 2, and the remaining organic substance floats in the medium layer member 2 or is dissolved by the attaching microorganisms. Thereafter, it is drained through the outlet pipe 7 as clean water.

(l) The newly formed particles 13 formed by decomposition of organic substances in the medium layer member 2 deposit on the blanket layer 15 according to the process and the sludge blanket layer 15 becomes more thick. However, if the blanket layer 15 exceeds a certain thickness, a portion of blanket layer 15 is deposited and the rest of the blanket layer remains due to the fact that the equilibrium of the deposition velocity and rising velocity has been broken.

According to the present invention, as the microorganisms cause decomposition of organic substances at a high rate within 1-5 days of the hydrographic staying time, the process time is very short, the efficiency of production increases, produced methane gas can be used as a source of energy, and the arrangement expense, chemical expense, electricity expense and operating expense can be reduced, while the quality of water is good, and thus, the effect on an ecosystem can be minimized when the wastewater is discharged into a river.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A process for the treatment of organic wastewater having 3,000 to 30,000 ppm B.O.D., which comprises the steps of:
    (a) passing organic wastewater out through a lower space disposed in the lower portion of a vessel having a height H, wherein the height of said lower space is about 0.2 H to 0.3 H, and wherein a thick and hard sludge blanket layer forms within said lower space after the treatment of said wastewater,
    (b) passing said organic wastewater of step (a) out through a medium layer member disposed in the middle portion of said vessel, wherein the height of said media layer member contains a plurality of media layers, each of said medial layers having as bent portion inclined to about 55° to 65°, and
    (c) passing said organic wastewater of step (b) out through an upper space disposed in the upper portion of said vessel, wherein the height of the upper space is about 0.1 H to 0.2 H, and from said lower space to said upper space through said medium layer member, wherein the velocity of a flow stream is about 0.5 to 2.5 m/day for about 1 to 5 days, whereby the organic wastewater treatment process effectively concentrates organic wastewater and effectively removes contaminants from the blanket and media layers.

2. The process for the treatment of organic wastewater of claim 1, wherein the bent portion of the media layers has a wave configuration.

3. The process for the treatment of organic wastewater of claim 1, wherein the plurality of media layers contact each other and are provided with a plurality of gaps, said gaps occupying over about 90% of the surface are of the medium layer and the specific surface area thereof being over about 120 $m^2/m^3$.

4. The process for the treatment of organic wastewater of claim 1, wherein the plurality of media layers includes about 3 to 5 layers.

5. The process for the treatment of organic wastewater of claim 1, wherein the media layer members have a small unevenness formed at the lowest surface thereof.

* * * * *